United States Patent [19]

Gray

[11] Patent Number: 5,037,114
[45] Date of Patent: Aug. 6, 1991

[54] LABYRINTH SEAL FOR STEAM TURBINES

[75] Inventor: Lewis Gray, Winter Springs, Fla.

[73] Assignee: Westinghouse Electric Corp., Pittsburgh, Pa.

[21] Appl. No.: 632,430

[22] Filed: Dec. 24, 1990

Related U.S. Application Data

[63] Continuation of Ser. No. 470,470, Jan. 26, 1990, abandoned.

[51] Int. Cl.$^5$ .......................................... F16J 15/447
[52] U.S. Cl. ........................................ 277/25; 277/53; 415/112; 415/169.4; 415/173.5; 415/174.5
[58] Field of Search ........................ 277/25, 54, 56, 53, 277/96.1; 415/168.1, 168.2, 168.4, 169.2, 169.3, 169.4, 110-112, 173.4, 173.5, 174.4, 174.5

[56] References Cited

U.S. PATENT DOCUMENTS

| | | | |
|---|---|---|---|
| 1,831,224 | 11/1931 | Baumann | 415/173.7 X |
| 3,339,933 | 9/1967 | Foster | 277/96 X |
| 3,632,225 | 1/1972 | Smith et al. | 415/169.4 |
| 3,897,169 | 7/1975 | Fowler | 277/53 X |
| 4,046,388 | 9/1977 | Meyer | 277/53 |
| 4,162,077 | 7/1979 | Crow et al. | 277/53 |
| 4,320,903 | 3/1982 | Ayache et al. | 277/53 X |
| 4,416,457 | 11/1983 | McGinnis et al. | 277/96.1 X |
| 4,465,429 | 8/1984 | Martin et al. | 415/173.7 X |
| 4,477,089 | 10/1984 | Hoffman et al. | 277/153 |
| 4,513,975 | 4/1985 | Hauser et al. | 277/74 X |
| 4,781,530 | 11/1988 | Lauterbach et al. | 415/173.1 |

Primary Examiner—William A. Cuchlinski, Jr.
Assistant Examiner—Scott Cummings

[57] ABSTRACT

A honeycomb labyrinth seal includes a downstream-most row of honeycomb cells which extends beyond the exit edge of a base portion, so that a portion of each cell of the downstream-most row of honeycomb cells overhangs the base portion by an amount approximately equal to one half the width of the drainage passages formed in the base portion.

9 Claims, 3 Drawing Sheets

LABYRINTH SEAL FOR STEAM TURBINES

This application is a continuation of application No. 07/470,470, filed 1/26/90, now abandoned.

BACKGROUND OF THE INVENTION

1. Field of the Invention

The present invention relates generally to honeycomb labyrinth seals and, more specifically, to an improved seal which is used for low-pressure steam turbines.

2. Description of the Related Art

A grooved honeycomb labyrinth seal for steamed turbines is described in U.S. Pat. No. 4,416,457 (assigned to Westinghouse Electric Corporation).

Referring to FIGS. 1 and 2 herein, the honeycomb labyrinth seal 3 described in the aforementioned U.S. patent is formed from a plurality of arcuate segments each comprising a base portion 7 and a plurality of rows of honeycomb cells 9 extending radially inwardly from the base portion 7 so that each cell 9 is open adjacent the blades 1. A plurality of passages or grooves 11 are so disposed that each cell 9 is connected to at least one passage, while the majority of the cells are connected to two passages or grooves 11. The groove 11 on the left side of the drawing is open to the upstream steam while the groove 11 on the right side of the drawing is open to the downstream and there is an interconnection between the grooves 11 and the cells 9 allowing steam and water entrained in the steam to flow across the base 7 of the seal from the upstream to the downstream side of the seal. The cells 9 are generally hexagonal having six walls, a plurality of which are common with adjacent cell walls.

An axially disposed gap 13 is disposed between the circumferentially adjacent honeycomb labyrinth seal segments which permits water collected in the grooves 11 to drain therefrom. An appropriate drain, not shown, is also disposed in the blade ring 5 to drain the water from the seal locating groove 4 in the blade ring 5.

FIG. 3A shows a typical arrangement for existing honeycomb seal designs in a steam turbine blade path. A radial step is formed between the seal inside diameter and the outer diameter of the downstream blade 16. A radial channel is formed between surface 12 and surface 12A for the purpose of removing steam and moisture from the blade path flow. It is difficult to achieve efficient turning of the flow leaving the rotating blade tip region (under the seal) and thus it is difficult for the moisture to enter the extraction slot. This can lead to disturbed flow conditions in this region.

It is postulated that moisture drainage from the seal may follow a generally axial path and become entrained into the main downstream flow through stationary blade 16, leading to increased moisture erosion damage to the downstream rotating blades.

By observing flow field behavior and moisture erosion characteristics downstream of a typical honeycomb seal installation, it has been determined that a disturbed flow pattern (standing vortex) can exist in association with the radial step between the inner diameter of the seal and the outer diameter surface at the inlet to the downstream stationary blade row. Also, moisture collected by the seal may not be flowing into the downstream moisture removal or extraction slot as intended. Both of these phenomena may be attributed to a limited ability of the extraction steam and water flow to negotiate the sharp 90° corner at the seal exit edge.

SUMMARY OF THE INVENTION

An object of the present invention is to provide an improved honeycomb labyrinth seal in which the drainage path for the moisture collected by the seal directs the exit water flow in an outward radial direction instead of axial.

Another object of the present invention is to provide an improved honeycomb labyrinth seal in which the centrifugal affects of the rotating blade are utilized to promote an outward radial flow of both steam and condensed water from the blade tip region near the exit edge.

These and other objects of the present invention are met by providing a honeycomb labyrinth seal cooperatively associated with rotatable steam turbine blades and including a base portion having an inlet edge and an outlet edge, a plurality of rows of honeycomb cells extending radially inwardly from the base portion so that each cell is open adjacent the blade, a plurality of passages so disposed that each cell is connected to at least one passage and at least one passage is open upstream of the rows of honeycomb cells and at least one passage is opened downstream of the rows of honeycomb cells, thereby permitting steam to flow through the passages and cells from the upstream side to the downstream side of the honeycomb labyrinth seal, wherein a downstream-most row of honeycomb cells extends beyond the exit edge of the backing plate, and wherein an exit edge of the rotating blades extends beyond the honeycomb labyrinth seal.

These and other objects and advantages of the honeycomb labyrinth seal of the present invention will become more apparent with reference to the following detailed description and drawings.

DETAILED DESCRIPTION OF THE PREFERRED EMBODIMENTS

Figure 1:
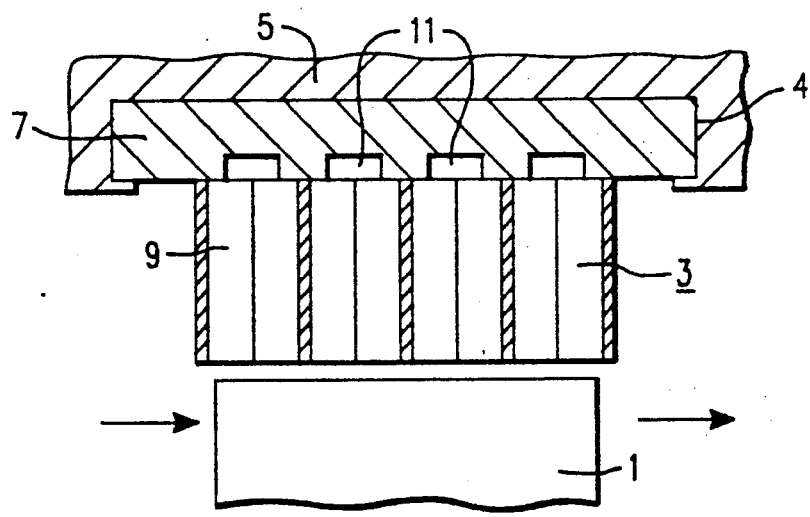
FIG. 1 is a partial sectional view of a known honeycomb labyrinth seal disposed in a portion of a steamed turbine taken along line I—I of FIG. 2.

Referring to FIGS. 3-6, the honeycomb labyrinth seal 3 is connected to a seal support ring 12 by any conventional means through a base portion 7. A moisture removal/extraction slot opening 14 is formed between downstream stationary blade 16 and the seal support ring 12 adjacent the upstream stationary blade 18. The rotating blade 1 rotates in a direction perpendicular to the flow direction.

The base portion 7 is provided with a plurality of passages by grooves 11. The labyrinth seal 3 is formed from a plurality of arcuate segments each comprising a base portion 7 and a plurality of rows of honeycomb cells 9 extending radially inwardly from the base portion 7 so that each cell 9 is open adjacent the blade 1. Each cell is connected to at least one passage 11.

Figure 2:
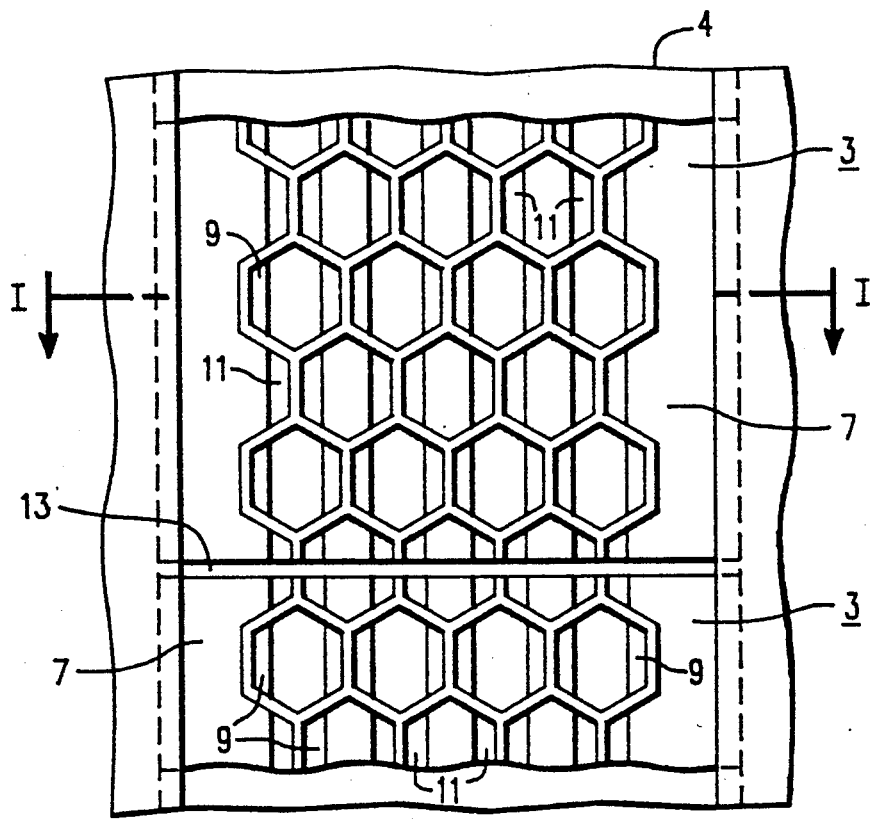
FIG. 2 is a plan view of the labyrinth seal of FIG. 1.

The base portion 7 has an exit side edge 20 which in the known seal described in FIGS. 1 and 2 would have extended further than the honeycomb cells, so that the downstream-most row of honeycomb cells would be centered over the downstream-most groove 11, with the downstream-most side of those cells supported on the base portion 7.

According to the present invention, the downstream-most row 9A of honeycomb cells 9 is centered over a strip 7A of the base portion at the exit side (the strip 7A having a width substantially the same as the width of the grooves 11) so that a portion of the cells in row 9A overhang the base portion 7. The arrangement promotes an internal moisture drainage path for those alternating groups of cells having circumferentially oriented cell wall elements centered over the drainage grooves 11. The exit drainage flow is thus directed in a radial direction as it leaves the honeycomb cells at the exit side. The radial drainage path is between the exit edge 20 of the base portion 7 and the outermost wall 22 of the cells 9 in row 9A. Moisture droplet flow centrifuged outwardly from the rotating blade tip and impinging on the open face of the honeycomb cells 9 will promote a radially outward path for the seal exit drain flow.

Figure 5:
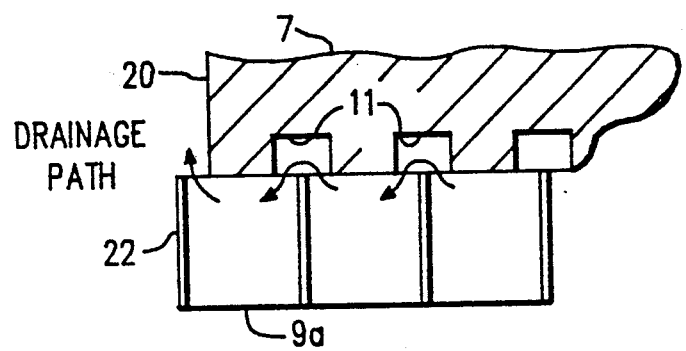
FIG. 5 is a cross-sectional view taken along line IV of FIG. 4.
Figure 6:
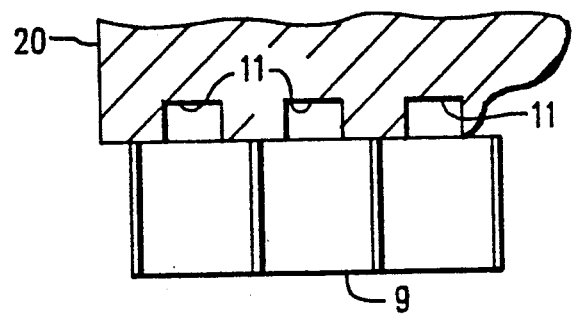
FIG. 6 is a cross-sectional view taken along line VI of FIG. 4.

FIG. 6 illustrates the circumferential-axial drainage path communication for all groups of cells adjacent to those shown in FIG. 5.

Generally, the desired internal water drainage characteristics for the seal 3 are determined by the inlet to exit pressure drop across the rotating blade row and the outward pressure generated by moisture droplets leaving the blade tip and entering the open face of the honeycomb cell structure.

Preferably, the downstream-most or exit side row of honeycomb cells extends beyond the exit edge 20 of the base portion 7 by about one half of a groove width.

Figure 3A:
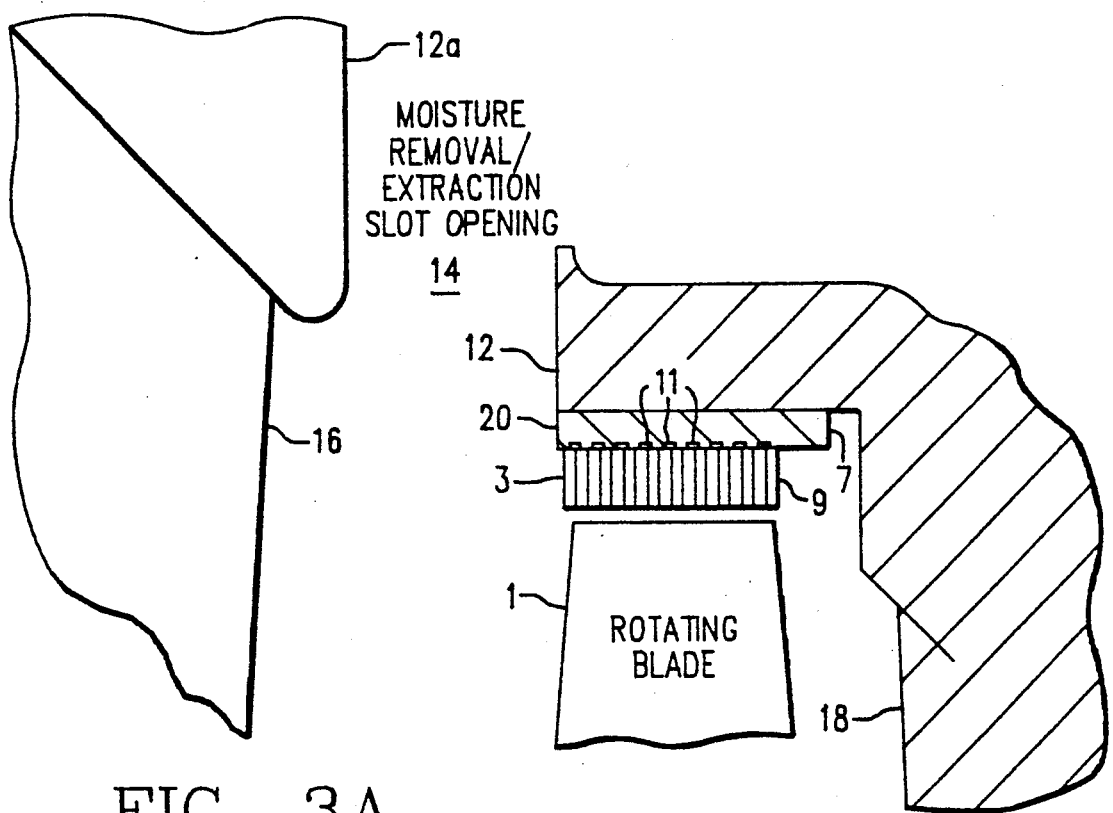
FIG. 3(a) is a partial cut away view showing the honeycomb labyrinth seal used prior to the present invention.
Figure 3B:
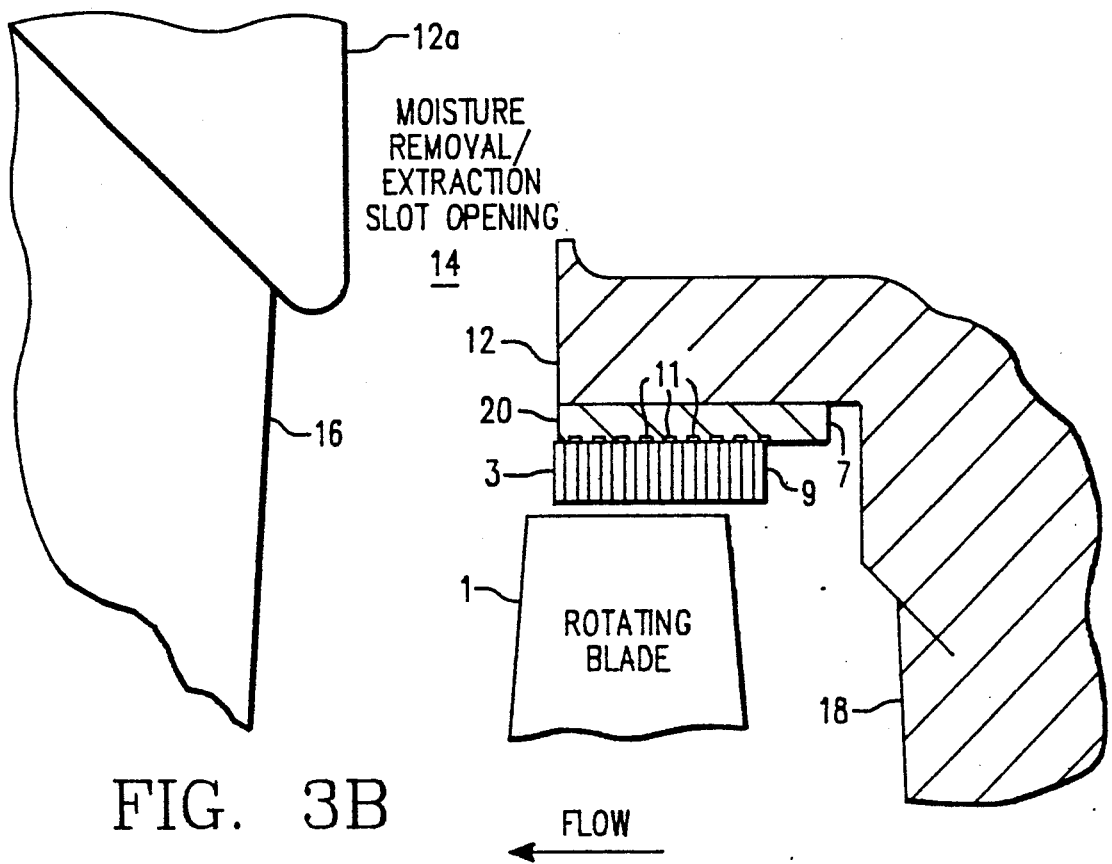
FIG. 3(b) is a partial cut-away view showing the honeycomb labyrinth seal according to a preferred embodiment of the present invention.
Figure 4:
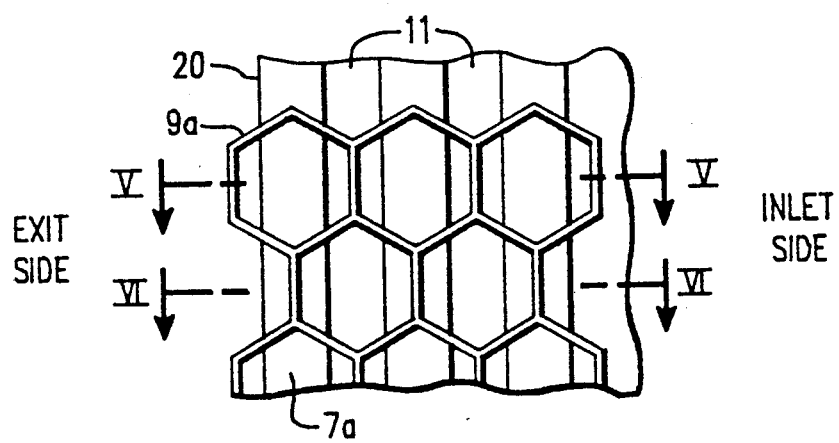
FIG. 4 is an enlarged top view of a portion of the labyrinth seal of FIG. 3.

Referring to FIG. 3, it is noted that the blade 1 preferably extends beyond the seal 3, rather than being centered under the seal as in the known seal of FIGS. 1 and 2. Preferably, the amount of extension is determined by the tip section width, with optimum overhang of the blade 1 being determined in relation to the width of throat opening. The overhang of the rotating blade exit edge promotes a seal exit drainage flow path in an outward radial direction due to pressure from centrifuged moisture droplet flow leaving the blade tip. Also, the rotating blade exit edge overhang also promotes radial expansion of steam flow immediately downstream of the seal 3. This tends to direct flow towards the moisture removal or extraction slot 14 and provide well behaved (low loss) flow conditions near the outer diameter surface at the inlet to the downstream stationary blade row.

The present invention allows for increased width of downstream extraction or moisture removal slots, or alternatively, allows reduced blade path axial spacing if the extraction slot is a critical restraint, due to upstream movement of the seal and blade ring exit faces 20 and 12 (FIG. 3) relative to the rotating blade.

Numerous modifications and adaptations of the present invention will be apparent to those so skilled in the art and thus, it is intended by the following claims to cover all such modifications and adaptations which fall within the true spirit and scope of the invention.

We claim:

1. A honeycomb labyrinth seal cooperatively associated with rotatable steam turbine blades, the honeycomb seal comprising:
    a base portion having an inlet edge corresponding to the upstream portion of the seal and an exit edge corresponding to the downstream portion of the seal and being mounted on a seal support ring having a radial surface;
    a plurality of rows of honeycomb cells extending radially inwardly from the base portion so that each cell is open adjacent the blade;
    a plurality of passages so disposed that each cell is connected to at least one passage and at least one passage is open upstream of the rows of the honeycomb cells and at least one passage is open downstream of the rows of the honeycomb cells, thereby permitting steam to flow through the passages and cells from the upstream side to the downstream side of the honeycomb; and
    a moisture removal/extraction slot opening disposed in a radial direction between the seal support ring and a downstream row of stationary blades;
    wherein a portion of a downstream-most row of honeycomb cells extends axially downstream beyond the exit edge of the base portion and the radial surface of the support ring, and
    wherein each rotating blade has an exit edge which extends axially downstream beyond the downstream-most row of honeycomb cells so that a radial drainage flow is induced by centrifugal force at the downstream-most row of honeycomb cells.

2. A honeycomb labyrinth seal as recited in claim 1 wherein the passages extend circumferentially adjacent the base portion.

3. A honeycomb labyrinth seal as recited in claim 1, wherein the passages are grooves disposed in the base portion.

4. A honeycomb labyrinth seal as recited in claim 1, wherein the cells are hexagonally shaped.

5. A honeycomb labyrinth seal as recited in claim 1, wherein the downstream-most row of honeycomb cells is centered over a strip of the base portion formed between the exit edge and the downstream-most passage, so that a portion of each cell in the downstream-most row of honeycomb cells overhangs, the, base portion.

6. A honeycomb labyrinth seal as claimed in claim 5, wherein the overhanging portion of each cell of the downstream-most row of honeycomb cells is substantially equal to one half the width of the passages.

7. A honeycomb labyrinth seal as recited in claim 1, wherein the downstream-most row of honeycomb cells extends beyond the exit edge of the base portion by about one half of a groove width.

8. A honeycomb labyrinth seal as recited in claim 1, wherein the exit edge of the backing plate is substantially in line with a downstream radial surface of a seal support ring.

9. A honeycomb labyrinth seal as recited in claim 1, wherein the rotatable blades are un-shrouded.

* * * * *